United States Patent
Vandervort et al.

(10) Patent No.: US 9,306,753 B1
(45) Date of Patent: Apr. 5, 2016

(54) MOBILE SYSTEM AND METHOD FOR IMPROVING SAFETY OF IMPROMPTU MEETINGS

(71) Applicant: Xerox Corporation, Norwalk, CT (US)

(72) Inventors: David R. Vandervort, Walworth, NY (US); Dale Ellen Gaucas, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/516,716

(22) Filed: Oct. 17, 2014

(51) Int. Cl.
*H04L 9/32* (2006.01)
*H04L 9/30* (2006.01)
*H04L 9/14* (2006.01)

(52) U.S. Cl.
CPC ............... *H04L 9/3247* (2013.01); *H04L 9/14* (2013.01); *H04L 9/30* (2013.01); *H04L 2209/24* (2013.01); *H04L 2209/72* (2013.01)

(58) Field of Classification Search
CPC ... H04L 9/3297; H04L 9/3247; H04L 9/3234; H04L 2209/80
See application file for complete search history.

(56) References Cited

U.S. PATENT DOCUMENTS

| | | | |
|---|---|---|---|
| 7,246,067 B2 | 7/2007 | Austin et al. | |
| 7,346,162 B2 | 3/2008 | Slavin | |
| 7,617,134 B2 | 11/2009 | Terrill et al. | |
| 7,761,386 B2 | 7/2010 | Teicher | |
| 8,107,402 B1 | 1/2012 | Everson et al. | |
| 8,219,501 B2 | 7/2012 | Teicher | |
| 8,270,933 B2 | 9/2012 | Riemer et al. | |
| 8,364,605 B2 | 1/2013 | Rosenthal et al. | |
| 8,577,292 B2 | 11/2013 | Huibers | |
| 8,615,520 B2 | 12/2013 | Fallah | |
| 8,621,005 B2 | 12/2013 | Boyd et al. | |
| 8,687,812 B2 | 4/2014 | Steele et al. | |
| 2004/0128152 A1* | 7/2004 | Austin | G06Q 30/02 705/319 |
| 2004/0141605 A1 | 7/2004 | Chen et al. | |
| 2008/0172485 A1 | 7/2008 | Du | |
| 2010/0010826 A1* | 1/2010 | Rosenthal | G06Q 99/00 705/1.1 |
| 2010/0114614 A1* | 5/2010 | Sharpe | G06Q 10/109 705/5 |
| 2013/0054375 A1 | 2/2013 | Sy et al. | |
| 2013/0054461 A1* | 2/2013 | Gupta | G06Q 20/0425 705/44 |
| 2013/0152185 A1* | 6/2013 | Singh | G06F 21/35 726/9 |
| 2014/0074637 A1* | 3/2014 | Hammad | G06Q 20/12 705/21 |
| 2014/0105403 A1 | 4/2014 | Baldi et al. | |

(Continued)

OTHER PUBLICATIONS

Asymmetric Keys, http://msdn.microsoft.com/en-us/library/windows/desktop/aa387460(y=vs.85).aspx, printed Oct. 16, 2014, 1 page.

(Continued)

*Primary Examiner* — Amir Mehrmanesh
(74) *Attorney, Agent, or Firm* — Kermit D. Lopez; Luis M. Ortiz; Ortiz & Lopez, PLLC (57) ABSTRACT

A system and method for enabling safety in and for initial impromptu meetings facilitated by electronic devices. Prior to the meeting, participants each download a same generated event ticket and the public key of the other meeting participant. At the meeting location, each individual's electronic device via a mobile application initiates close-proximity communication with the other mobile application; signs the ticket with its stored private key; exchanges signed tickets; verifies the received signed ticket using the downloaded public key; and compares the verified signed ticket with the downloaded ticket to authenticate the other individual.

20 Claims, 6 Drawing Sheets

(56) References Cited

U.S. PATENT DOCUMENTS

2014/0298035 A1* 10/2014 Tredoux ............... H04L 9/3297
                                                        713/178
2015/0172059 A1*  6/2015 Tredoux ............... H04L 9/3247
                                                        713/176

OTHER PUBLICATIONS

Near Field Communication. http://developer.android.com/guide/topics/connectivity/nfc/index.html, printed Oct. 16, 2014, 2 pages.
NFC gem. https://github.com/tenderlove/nfc, printed Oct. 16, 2014, 3 pages.
PhoneGap. http://phonegap.com/, printed Oct. 16, 2014, 5 pages.
Simple NDEF Exchange Protocol. http://www.cardsys.dk/download/NFC_Docs/NFC%20Simple%20NDEF%20Exchange%20Protocol%20Specification.pdf, Aug. 31, 2011, 20 pages.
Introducing JSON. http://www.json.org/, printed Oct. 16, 2014, 7 pages.
Igoe, T. et al., Beginning NFC Near Field Communication with Arduino, Android and PhoneGap (2014) O'Reilly Media, Inc., Sebastopol, CA, 245 pages.
iOS: Use AirDrop to wirelessly share content. http://support.apple.com/kb/ht5887, printed Oct. 16, 2014, 5 pages.

\* cited by examiner

```
On Detecting Signed Event Ticket Transmission (phone bump)
Compare ticket to known accepted tickets
    if ticket found
        Validate ticket signature
        Validate user signature
            User public key may be on file or may need to be retrieved from event hub
            Security principle: do not trust keys send from the originating phone. It may be forged.
        if all signatures validated
            Send acceptance message
            Display acceptance message
```

MOBILE SYSTEM AND METHOD FOR IMPROVING SAFETY OF IMPROMPTU MEETINGS

FIELD OF THE INVENTION

Embodiments are related to techniques and devices for ensuring the safety of participants at meetings. Embodiments also relate to cryptographic applications and, for example, cryptographic key pairs of public and private keys.

BACKGROUND

Social meeting websites use various methods to ensure the safety of participants including background checks, recent photo verification, generated codes for permitting profile viewing, ratings of a member by another after a sufficient number of interactions, quantification of connectivity, proximity and trust level in a social network, and so forth. For example, a dating site may guarantee that an individual's profile is accurate, their photo is up-to-date, and their ratings are legitimate so that both parties feel secure when meeting in person for the first time. For less structured situations such as, for example, a website for finding jogging partners or spur of the moment car-ride sharing, a system is desired, which does not depend on detailed background checks and recent photo verification, but relies on member recommendations and trust networks. For these types of meeting sites, there is still a need for an additional level of trust when two individuals are meeting for the first time.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a system and method for improving safety of impromptu meetings and spur of the moment activities involving two or more participants.

It is another aspect of the disclosed embodiments to provide for a mobile application or "app" that utilizes event tickets and cryptographic key pairs stored on portable electronic devices along with public keys stored on the a server.

The aforementioned aspects and other objectives and advantages can now be achieved as described herein. A system and method is disclosed, which supports safe, first-time, in-person meetings for an activity such as jogging or car-ride sharing. The disclosed embodiments augment existing approaches used by social meeting websites such as profile verification and social network trust levels through the addition of a smart phone app that confirms the identity of the individual parties at the meeting location.

In a preferred embodiment, a mobile "app" can be configured, which utilizes event tickets issued by the site, cryptographic key pairs stored on a portable electronic device (e.g., a smartphone), and public keys stored on the site. Prior to an actual meeting arranged on the site, two members each download the same generated event ticket and also the public key of the other member. At the meeting location each individual's phone app: (1) initiates close-proximity communication with the other phone app using technologies such as wireless/cellular networking, Bluetooth, accelerometers, and NFC; (2) signs the ticket with its stored private key; (3) exchanges signed tickets: (4) verifies the received signed ticket using the downloaded public key; and (5) compares the verified signed ticket with the downloaded ticket to authenticate the other individual.

One or more embodiments can be implemented in the context of a system that includes a server that maintains a publicly searchable database of public keys of all participants, including itself. Such a system also can include an "app" running on each meeting participants' electronic device (e.g., smartphone, tablet computing device, etc.). Each user's app, running on their smart phone or similar device, generates a key pair. The app keeps the private key secure, but makes the public key available to anyone who asks for it (or anyone related to the system). This can include the application server.

When a meeting is to happen, the following steps can occur. First, the server generates a ticket. The server then signs the ticket with its own private key. The server can add the public keys of the users (participants) to the ticket before or after signing the ticket or can send the ticket and public keys of the users separately. In any case, each user in the meeting must have the other user's public key to complete the meeting.

The server sends the signed ticket to the participants. Then, when the participants meet, the app on each phone downloads the server public key if it has not already done so, uses the server public key to verify that the signature is valid, signs the ticket again with its own private key, and sends the newly signed ticket to the other user. And, when each of the participants' respective electronic devices receives the doubly signed ticket (signed once by the server and again by the user) from the other user, the app uses the public key of the other user to verify the signature.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
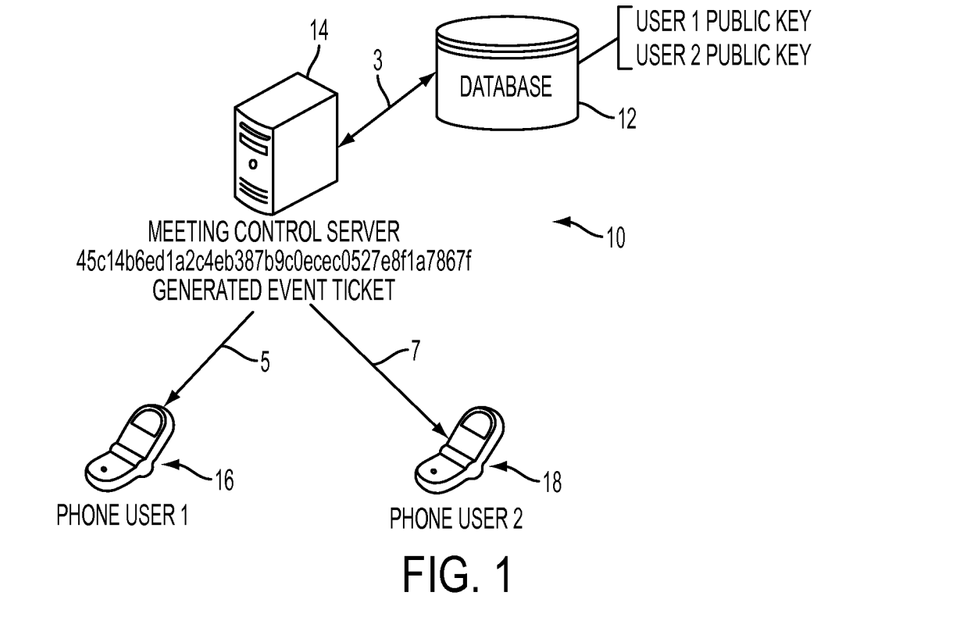
FIG. 1 illustrates a schematic diagram of a system that enables two individuals to verify their identities at a meeting location via portable electronic devices, in accordance with a preferred embodiment.

FIG. 1 illustrates a schematic diagram of a system 10 that enables two individuals to verify their identities at a meeting location via portable electronic devices 16, 18, in accordance with a preferred embodiment. System 10 shown in FIG. 1 implements a capability provided by a social meeting site that enables two individuals via respective electronic devices 16, 18 to verify their identities at a meeting location. A meeting control server 14 can communicate electronically with a database 12 and electronic devices 16, 18. Communications as indicate by arrows 5, 7 between the server 14 and the electronic devices 16, 18 preferably occur via a wireless electronic network (e.g., cellular network, WiFi, etc.).

System 10 preferably employs, for example, an "app" (e.g., a smartphone app) that uses cryptographic key pairs where such keys can be issued by a third party or generated on the smartphone by an application. The key pair can include (1) a private key that remains securely on the smartphone and which is used to digitally sign a string, and (2) a public key that can be utilized to verify the signature.

Note that as utilized herein, the term "app" generally refers to a mobile application (e.g., a computer program and/or software module(s)) that is designed to run on, for example, electronic devices such as smartphones, tablet computers, and other mobile devices. Such apps are usually available through application distribution platforms and are downloaded from the platform to a target device, such as a smartphone, tablet computers, etc. The term "app" is a shortening of the term "application software".

System 10 can also employ a backend function for a social meeting site that (1) stores the public keys of site members in a database, and (2) uses a meeting control server to generate a one-time-use ticket when two individuals arrange a meeting. When a ticket is issued, each individual downloads to their smartphone app both the generated ticket and the public key of the other individual as shown in FIG. 1. Note that the meeting ticket can be signed by the site in the same way that each individual phone signs it, so that the authenticity of the ticket can be verified by both participants.

Note that in public key cryptography, each individual user generates 2 keys—a public key and a private key. As the name implies, the private key is never revealed to anyone else (or to any other system if the "individual" involved is software). Loss of control of the private key is a compromise that invalidates the security. The public and private key together make a key pair. Public keys, however, can be and are freely transferred with others. This is because the public key—and only the public key—can verify anything signed by the private key and vice versa.

Thus, system 10 and the disclosed approach have a number of unique properties. For example, the server 14 can maintain database 12 as a publicly searchable database of public keys of all participants, including itself. (Note that public keys are meant to be easily found. An example of a search repository can be found at this URL: https://pqp.mit.edu/). Each user's "app" running on their respective electronic devices 16, 18 (e.g., smartphone, tablet computing device, etc.) generates a key pair and keeps the private key secure. The app can make the public key available to anyone who asks for it (or anyone related to the system). This includes the application server, which may be, for example, server 14.

When a meeting is to happen, the following steps can occur in the following sequence. The server 14 generates a ticket and then the server 14 signs the ticket with its own private key. Note that the server 14 can add the public keys of the user(s) to the ticket before or after signing the ticket or can transmit the key(s) separately. In any case, each user in the meeting must have the other user's public key to complete the meeting. The server 14 then sends the signed tickets to the participants (e.g., users of electronic devices 16, 18). Then, when the participants do meet, the app on each device 16, 18 will download the server public key if it has not already done so, use the server public key to verify that the signature is valid, sign the ticket again with its own private key, and send the newly signed ticket to the other user. When each system receives the doubly signed ticket (signed once by the server and again by the other user's electronic device) from the other user's system, the app uses the public key of the other user to verify the signature.

Figure 2:
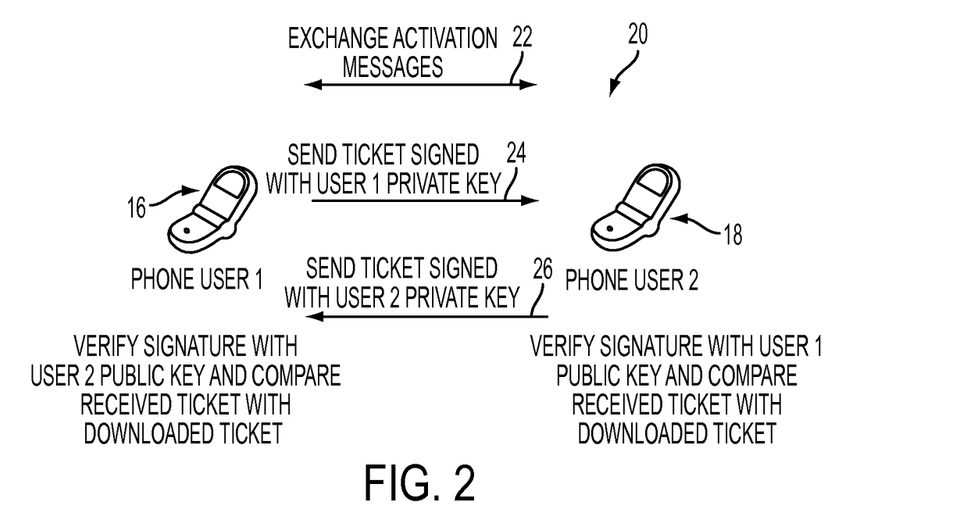
FIG. 2 illustrates a schematic diagram of a process for verifying identities at a meeting location via portable electronic devices, in accordance with a preferred embodiment.

FIG. 2 illustrates a schematic diagram of a process 20 for verifying identities at a meeting location via portable electronic devices, in accordance with a preferred embodiment. When two members of the site meet in person for the first time, they can touch their electronic devices 16, 18 to initiate close-proximity communication using technologies such as, for example, Bluetooth, WiFi, sound waves, and NFC (Near Field Communications). Each device 16, 18 sends a multipart message to the other, the first part of which activates the associated app on the other device. This ensures that the ticket-signing operation takes place and the correct data is sent by the app. Upon receiving the signed ticket, the app verifies the signature using the pubic key of the other user and compares the received ticket to the downloaded ticket in order to verify the identity of the other user.

Arrow 22 shown in FIG. 2 indicates an exchange of activation messages. Arrow 24 indicates sending of a ticket signed with a first user private key and arrow 26 indicates sending of a ticket signed with the second user private key. That is, the electronic device 18 is associated with the second user or participant, and the electronic device 16 is associated with the first user or participant.

Various technologies can be utilized to enable close proximity communication between the users' smart devices. Although the exemplary implementation approach described herein uses Near Field Communication (NFC) for enabling device communication, the disclosed embodiments are not restricted to NFC.

NFC is a short-range wireless technology that enables devices such as Android phones to share small amounts of data. NFC devices communicate in a binary format that is unreadable to humans. To mitigate this problem, there are numerous programming libraries that provide wrappers for developing messages in more human friendly ways and translating them into the necessary protocols for transmission. One example is the ruby nfc gem. Another common library is PhoneGap, which allows apps to be written in JavaScript and HTML5.

Figure 3:
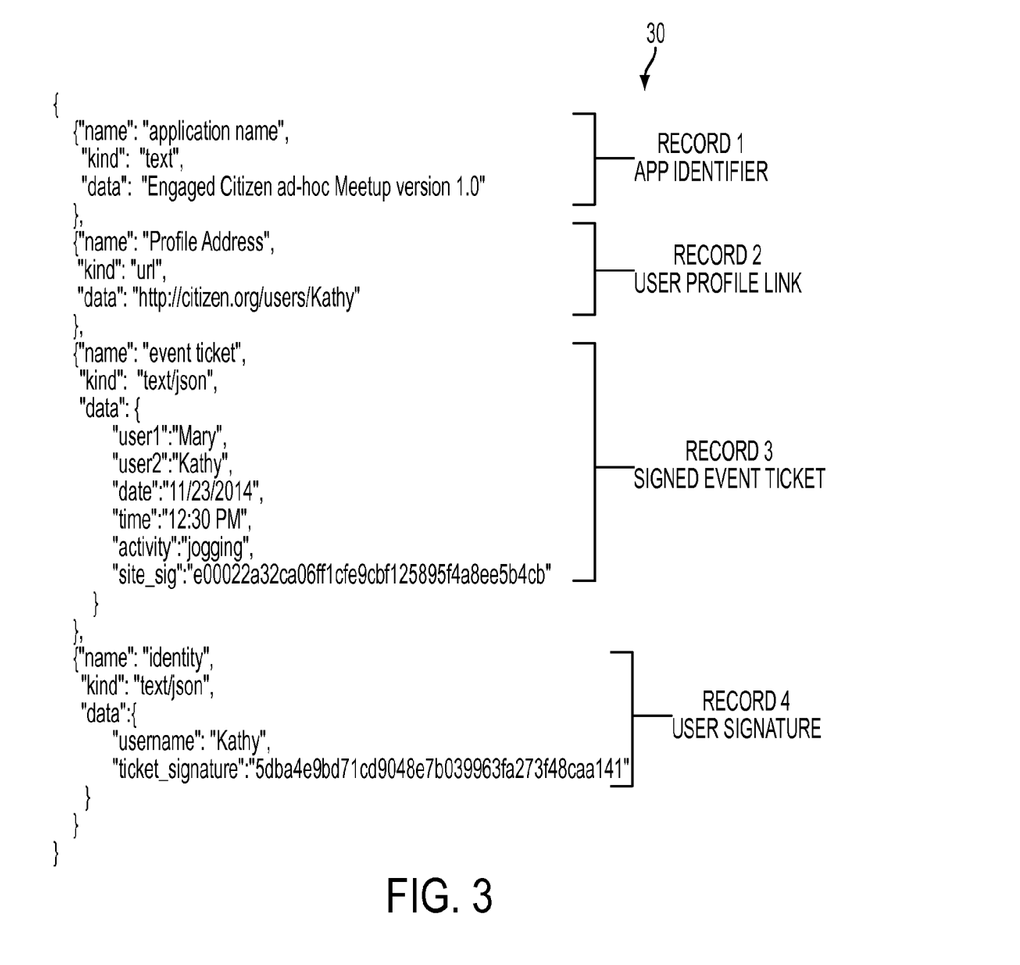
FIG. 3 illustrates a sample meeting exchange message before translation to binary form, in accordance with an alternative embodiment.

FIG. 3 illustrates a sample meeting exchange message 30 before translation to binary form, in accordance with an alternative embodiment. FIG. 3 shows a sample SNEP message in JSON data-interchange format. A SNEP message, like any NFC message, is made up of header information and a series of records. Each record contains key value pairs. The value associated with the "kind" key describes the type of data in the record 'payload' (shown in FIG. 3 as "data"). The "kind" must be one of a small set of known types, including standard MIME types.

There are four records (Record 1, Record 2, Record 3, Record 4) indicated in the FIG. 3 example. Record 1 is a general header containing application information. Record 2 gives information about the user whose device is sending the message. In the example, it points to the user's profile on the site, i.e., the user information includes a general profile URL where information such as community reputation and public key are available. Identifying the user is required in order to verify the signature and ticket later.

Record 3 contains details of the event ticket, including the identities of both users, and the time and place and type of activity. Importantly, the ticket is signed by the hosting site with its own private key. This allows the app to validate the signature with the site's public key thereby protecting against spoofed-ticket attacks. Record 4 contains the data necessary for the receiving device to validate the identity of the sender by checking the included signature against the sender's public key.

The sequence of actions from event choice to completion will always be similar to the following example. A user, called Kathy for this example, signs up for the event site. This can be a website or an extension of the app. The site maintains the central database (e.g., database 12 shown in FIG. 1) and has a public/private key pair associated with it.

After successful sign up, Kathy downloads the mobile event scheduling app and links it to her account on the site. A public/private key pair can be generated either by the app or the site or even an external program or service, however, only the app stores the private key and the site must have a copy of the public key that can be searched for by others.

Kathy starts the app on her device when she wishes to pair with someone for a spontaneous event. In this example, she wants a partner to go jogging with her in the park. She enters this event into the app, including the time and location. She then waits for responses.

Other users open their own instances of the app to browse for events. One of them, Mary, for example, has scheduled an alert for fitness related events in her geographic area. When her smartphone buzzes, she looks at it and sees a notification of Kathy's request for a jogging partner. She thinks this is smart because jogging alone is not always safe. Other available events are also displayed, but Mary selects jogging and sends a notice of interest.

Figure 4:
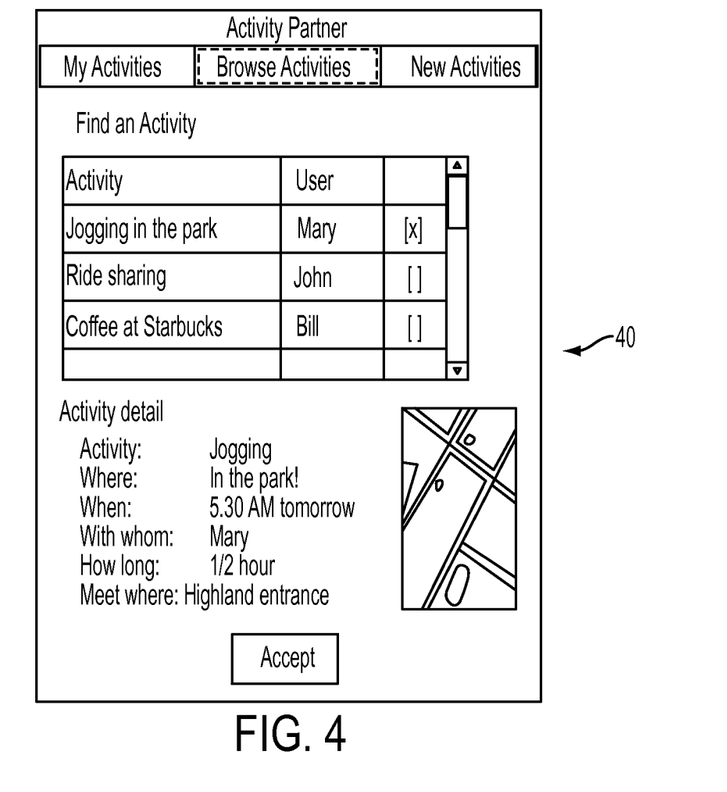
FIG. 4 illustrates a sample event browser screen, in accordance with an alternative embodiment.

FIG. 4 illustrates a sample event browser screen 40, in accordance with an alternative embodiment. FIG. 4 shows a sample of the screen 40 that Kathy might use to browse open events and choose jogging with Mary. Kathy, checking her phone a little later (possibly in response to an alert) sees that several people have responded to her event. The first one has received poor ratings from other people who have joined him in events, so she rejects him right away. Mary, on the other hand, has a good reputation. Kathy clicks the "accept" button next to Mary's name.

The site generates an event ticket as described above and sends a copy of the ticket to Mary's and Kathy's devices. The site may include each person's public key in the ticket or the app may download them as required. When the time comes to go jogging, Mary and Kathy meet at the designated entrance to the park. They may be aided in finding each other by a profile picture or other mechanism such as the phone's GPS or a location-based event.

Figure 5:
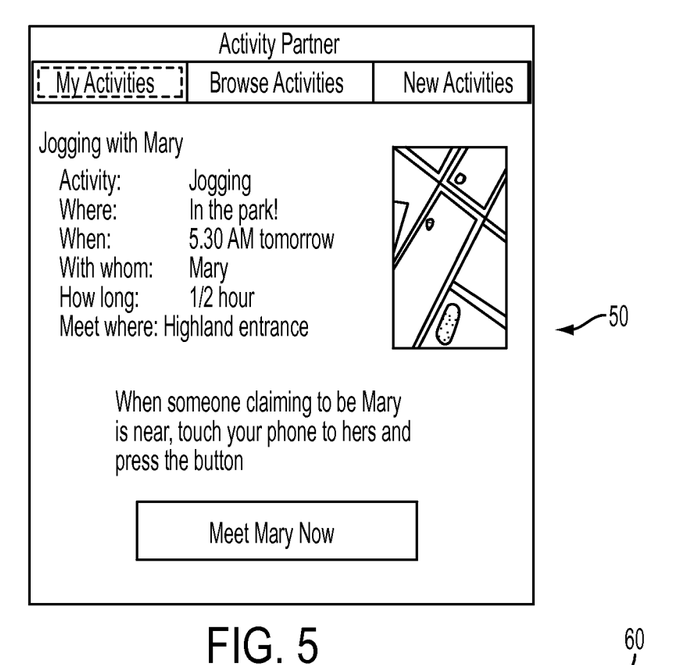
FIG. 5 illustrates a sample meeting initiation screen, in accordance with an alternative embodiment.

FIG. 5 illustrates a sample meeting initiation screen 50, in accordance with an alternative embodiment. That is, Kathy, seeing Mary first, starts the app on her electronic device (e.g., smartphone, tablet computer, etc.) and approaches Mary. After greeting each other, Mary holds out her phone and they touch phones. Kathy touches the meeting button on her phone (e.g., labeled "Meet Mary Now" in the screen 50 shown in FIG. 5).

In current Android implementations, for example, NFC enabled devices continuously search for other NFC enabled devices. When Kathy's app is open and the meeting button of screen 50 is selected, the default behavior of the devices is overridden and a message such as that shown in FIG. 3 is sent to the other device.

Figure 6:
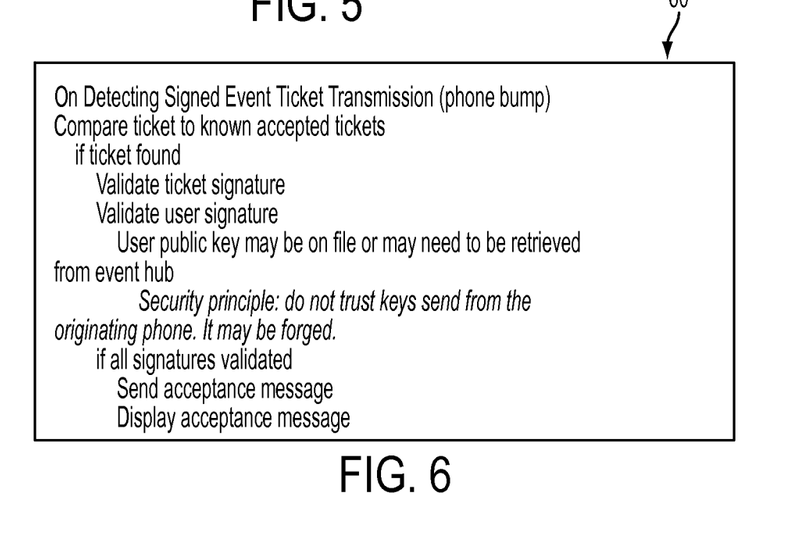
FIG. 6 illustrates a sample pseudo-code for performing particular actions for validating a meeting via a portable electronic device, in accordance with an alternative embodiment.

The operating system of the receiving device looks for information about the correct app to handle the message in the SNEP header (not shown in FIG. 3). If the correct app is not already open, it is started. If it is not found on the device, the operating system will attempt to open a source from which it can be installed. Once the app is running on the receiving device, the message is passed to it and a success result message is sent to the sender. In this example, Mary's phone opens the meeting app for her. The app can then perform actions according to, for example, particular instructions. Such instructions are illustrated via, for example, pseudo-code. That is, FIG. 6 illustrates sample pseudo-code 60 for performing particular actions for validating a meeting via a portable electronic device, in accordance with an alternative embodiment.

Figure 7:
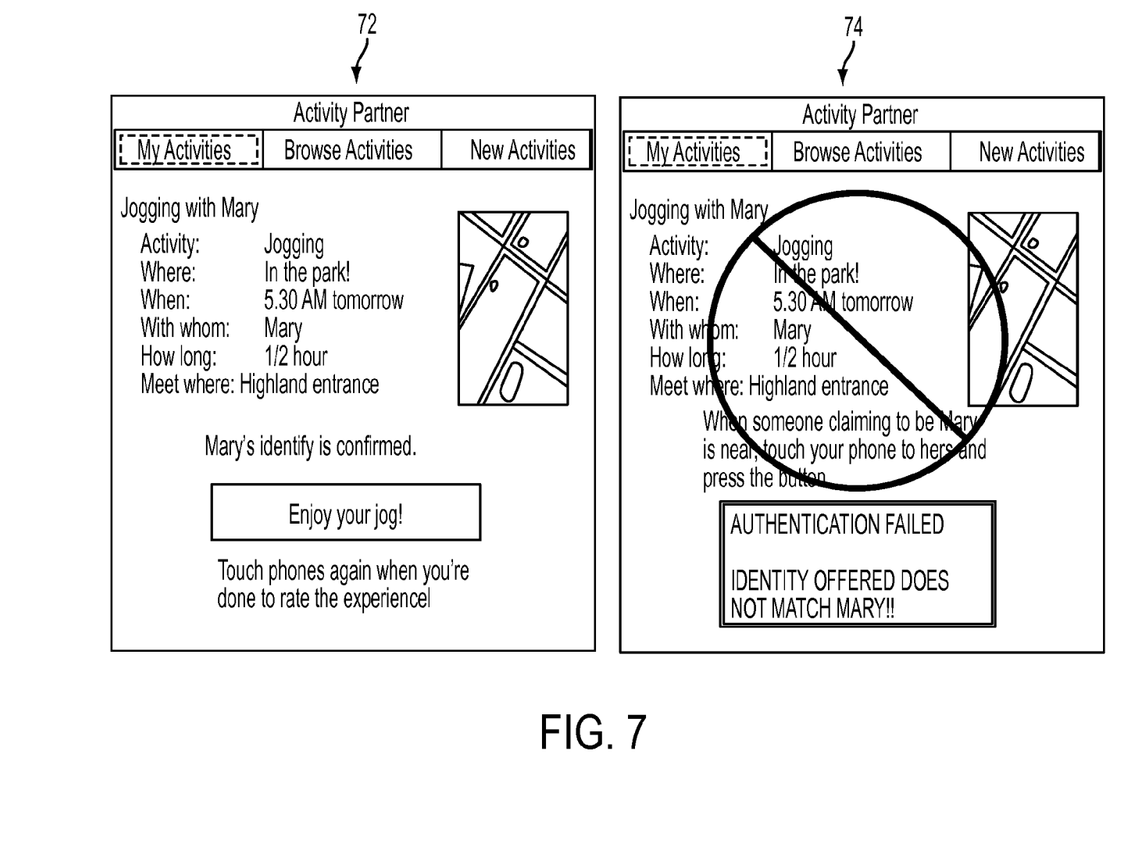
FIG. 7 illustrates sample screens for successful and failed validation in accordance with an alternative embodiment.

FIG. 7 illustrates sample screens 72, 74 for successful and failed validation in accordance with an alternative embodiment. FIG. 7 shows screens 72, 74 displaying messages for both a successful and failed validation of the meeting information. This feedback protects people from being fooled by potentially harmful actors. Additional security measures on a bad meet (not necessarily required but certainly desirable) may involve sending a message to the police or might record all available information about the other person's phone. It might even automatically take a picture of the person who was not who they claimed to be and send it to the event site.

In the example, the message and ticket signatures are validated. After Mary's instance of the app validates the signatures, it sends a message similar to FIG. 3 back to Kathy's phone so her instance of the meeting app can perform the same validation steps. Thus, before they jog, both users can be certain they have met the intended person. In this example case, both signatures are accepted. Mary and Kathy then jog through the park together.

After they jog, they both are prompted by the app to rate the experience. This rating goes into calculations of reputation for each of them, so other people seeking partners for activities in the future can have real world feedback to help them decide who to partner with. Ratings submitted through the app can be signed by the user's private key and directly reference the meeting ticket so the site can verify that the rating is authentic.

Note that this example uses two jogging partners. In the case that three or more people meet for an event, each member could touch their phones with the owner of the event thereby enabling multiple pairwise meetings. If the event ticket supported multiple users, then any two accepted to the event could initiate validation.

There are many meeting applications with various types of verification methods for the safety of participants. However, our preferred embodiment makes use of cutting edge technology to maximize both convenience and safety. NFC communication is well established, but its peer-to-peer uses are relatively new. Even many smartphones (e.g., notably Apple's iPhone's previous to iPhone 6) do not yet have NFC capability or do not support the SNEP protocol. Over time, these capabilities are likely to become standard in mobile devices.

The disclosed approach can be developed as part of a suite of services that can allow individuals to engage with one another and their local environment in a smarter, safer, and more sustainable manner. As cities strive to reduce crime, for example, the disclosed embodiments can assist citizens in avoiding being victimized Several of the disclosed features, such as the integration of public key cryptography with the phone app and a central site that manages public keys and the gathering of reputation data at the time of use, are generalizable across an entire suite of applications. That is, someone who has a good reputation as a jogging partner might also be considered a good risk to buy merchandise from, or to go to church with in a dangerous area at night, or to participate in a neighborhood watch, or any of a huge array of other community-oriented activities.

The strong identification mechanism implemented via the disclosed embodiments can buttress the quality of any reputation mechanism by rendering it exceedingly difficult to "game the system" or, for example, forge ratings. The use of NFC communication, for example, can also strengthen the system by making authentication, verification, and (in some implementations) feedback real-time, event-driven systems. This approach creates a new and important safety measure and a system on which future innovations can be constructed.

The embodiments are described at least in part herein with reference to flowchart illustrations, and/or schematic/block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
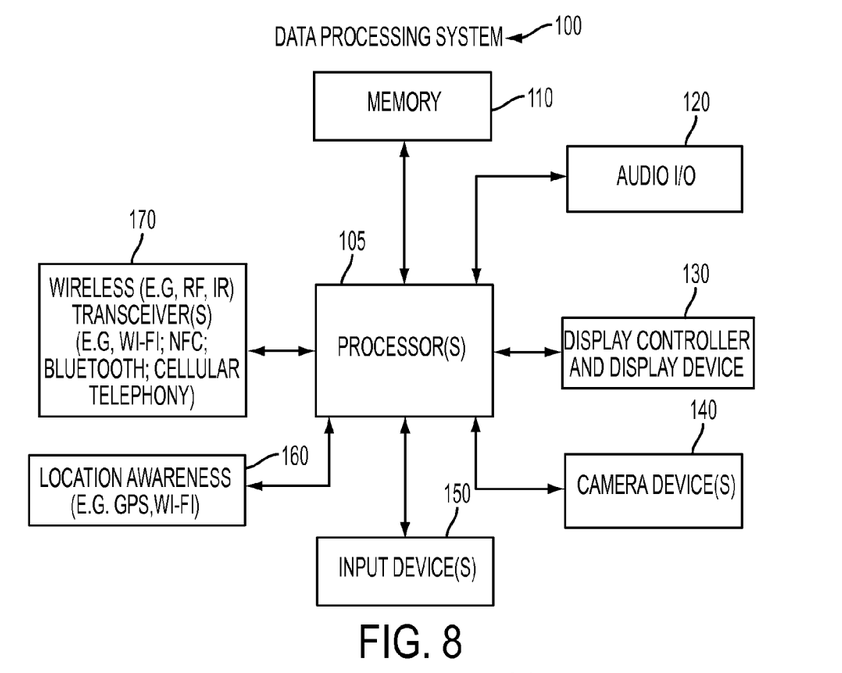
FIG. 8 illustrates a block diagram of an example of a mobile data processing system suitable for use with one or more of the described embodiments.

FIG. 8 illustrates a block diagram of an example mobile data processing system 100 on which applications implementing the disclosed method/system for facilitating safety for impromptu meetings may execute. The data processing system 100 includes a processing system 105 with one or more microprocessors. The system 100 also includes memory 110 for storing data and programs for execution by the processing system. The system 100 additionally includes an audio input/output subsystem 120 which may include a microphone and a speaker for playing back music or providing telephone functionality through the speaker and microphone. Data-processing system 100 is an example of, for example, devices 16 or 18 discussed earlier.

A display controller and display device 130 can be used to provide a graphical user interface for the user, such as the graphics user interface provided by mobile devices such as, for example, an Android-based mobile device, the iPhone, iPad, etc. Additionally, the display and audio functionality can be coupled to provide video playback or video communication services. A wireless transceiver 170 can transmit and receive data via one or more wireless technologies such as Near Field Communication (NFC), Wi-Fi, infrared, Bluetooth, or one or more variants of wireless cellular technology.

One embodiment of system 100 can contain one or more camera devices 140 configured in both a front and rear facing configuration, though similarly configured systems each with a front facing camera, or no camera, can be one of many optimal configurations. The data processing system 100 can also include one or more input devices 150 that allow a user to provide input to the system. Input devices can include a keypad or keyboard, alone or in conjunction with a voice recognition system, or a touch or multi touch panel that is overlaid on the display device 130. Additionally, embodiments of the data processing system 100 can also include a device for providing location awareness services, such as a Global Positioning System (GPS) device 160 or its equivalent.

It is to be noted that the data processing system 100 as represented in FIG. 8 is by way of example. One or more buses or interfaces, which are not shown, can be used to interconnect the various components, as is well known in the art. As well, additional components, not shown, may also be part of the system 100 in certain embodiments, and in certain embodiments, fewer components than shown in FIG. 8 may also be used.

Figure 9:
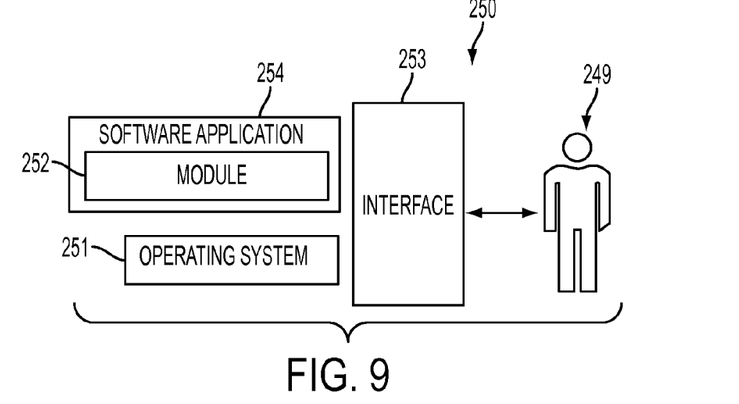
FIG. 9 illustrates a schematic view of a software system including a module, an operating system, and a user interface, in accordance with one or more of the described embodiments.

FIG. 9 illustrates a computer software system 250 for directing the operation of the data-processing system 100 depicted in FIG. 8. Software application 254, stored in main memory 110 and/or on a server such as, for example, server 14 shown in FIG. 1, generally includes a kernel or operating system 251 and a shell or interface 253. One or more application programs, such as software application 254, may be "loaded" (i.e., transferred from the memory 110 and/or, for example, server 14 for execution by the data-processing system 100). The data-processing system 100 can receive user commands and data through, for example, the user interface 253; these inputs may then be acted upon by the data-processing system 100 in accordance with instructions from operating system 251 and/or software application 254 typically embodied in a module such as module 252.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. An example of a "module" is module 252 shown in FIG. 9, which may be in some embodiments an "app" as discussed earlier herein. In other embodiments, the module 252 may comprise an app that runs on a mobile electronic device and/or associated software running on a server such as, for example, server 14 shown in FIG. 1.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 253, which is preferably a graphical user interface (GUI), also serves to display results, whereupon the user may supply additional inputs or terminate the session. In some embodiment, operating system 251 and interface 253 can be implemented in the context of a single OS or with multiple different OS types (e.g., Android, Apple, Windows, Mac, Linux, etc.). Software application 254 can include instructions for carrying out, for example, operations such as that shown in FIG. 1 such as the various operations described herein with respect to the various aspects shown and described herein with respect to FIGS. 1-7.

FIGS. 8-9 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software.

Based on the foregoing, it can be appreciated that a number of embodiments, preferred and alternative, are disclosed. In an example embodiment, a system can be implemented for enabling safety in and for initial impromptu meetings facilitated by electronic devices. Such a system can include, for example, a database of public keys of participants including a first participant and a second participant, with each public key associated with a private key that is in the possession of the associated participant. Such a system can further include a server that maintains the database and which generates and signs a ticket with a private key associated with the server, the private key being associated with a public key, and which sends a signed ticket to the first and second participants, wherein when the first and the second participants meet each other with respective first and second electronic devices for a meeting. Note that verification of the signed ticket can take place prior to a meeting and not necessarily at the time of the meeting.

In such a system, the public key associated with the server can be downloaded to each of the first and second electronic devices if not already done and the public key associated with the first participant and the public key associated with the second participant are obtained by the second and the first electronic devices respectively if not already done and the public key associated with the server is employed by each of the first and second electronic devices to verify that the signature associated with the signed ticket is valid if not already done. Additionally, in such a system, the first and second electronic devices can electronically sign the signed ticket again with the first participant's private key and the second participant's private key respectively to generate a newly signed ticket which is then sent from each of the first and second electronic devices to the other, whereupon when each of the first and second electronic devices receive the newly signed ticket from the other, the public keys associated with the first and second participants are used to verify that the signed tickets sent by the first and second participants respectively are valid to ensure that the meeting is safe. Note that the database is preferably a publicly searchable database.

In some embodiments, the first and second electronic devices can communicate with and transfer data to and from each other via close-proximity communications. In an alternative embodiment, the close-proximity communications can constitute Bluetooth wireless communications. In other embodiments, the close-proximity communications can include WiFi wireless communications. In yet another embodiment, the close-proximity communications can involve the use of sound waves. In still another embodiment, the close-proximity communications comprise NFC.

In another embodiment, the each of the first and second electronic devices can send a multipart message to one another, wherein a first part of the multipart message activates an associated app on the other device. In yet another embodiment, each of the first and second electronic devices can send a multipart message to one another, wherein a first part of the multipart message activates an associated app on the other device.

In yet another embodiment, a method for enabling safety in and for initial impromptu meetings facilitated by electronic devices can be implemented. Such a method can include the steps or logical operations of, for example, providing a database of public keys of participants including a first participant and a second participant, with each public key associated with a private key that is in the possession of the associated participant, and instructing a server to maintain the database and to generate and sign a ticket with a private key associated with the server, the private key being associated with a public key, and to further send a signed ticket to the first and second participants, wherein when the first and the second participants meet each other with respective first and second electronic devices for a meeting.

In such a method, the public key associated with the server can be downloaded to each of the first and second electronic devices if not already done and the public key associated with the first participant and the public key associated with the second participant are obtained by the second and the first electronic devices respectively if not already done and the public key associated with the server is employed by each of the first and second electronic devices to verify that the signature associated with the signed ticket is valid if not already done Additionally, in such a method, the first and second electronic devices electronically can sign the signed ticket again with the first participant's private key and the second participant's private key respectively to generate a newly signed ticket which is then sent from each of the first and second electronic devices to the other, whereupon when each of the first and second electronic devices receive the newly signed ticket from the other, the public keys associated with the first and second participants are used to verify that the signed tickets sent by the first and second participants respectively are valid to ensure that the meeting is safe.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A system for enabling safety in and for initial impromptu meetings facilitated by electronic devices, said system comprising:
   a database of public keys of participants including a first participant and a second participant, with each public key associated with a private key that is in the possession of the associated participant;
   a server that maintains said database and which generates and signs a ticket with a private key associated with said server, said private key being associated with a public key, and which sends a signed ticket to said first and second participants, wherein when said first and said second participants meet each other with respective first and second electronic devices for a meeting;
   wherein said public key associated with said server is downloaded to each of said first and second electronic devices if not already done and said public key associated with said first participant and said public key associated with said second participant are obtained by said second and said first electronic devices respectively if not already done and said public key associated with said server is employed by each of said first and second electronic devices to verify that said signature associated with said signed ticket is valid if not already done;
   wherein said first and second electronic devices electronically sign said signed ticket again with said first participant's private key and said second participant's private key respectively to generate a newly signed ticket which is then sent from each of said first and second electronic devices to the other, whereupon when each of said first and second electronic devices receive said newly signed ticket from the other, said public keys associated with said first and second participants are used to verify that said signed tickets sent by said first and second participants respectively are valid to ensure that said meeting is safe;
   wherein said first and second electronic devices communicate with and transfer data to and from each other via close-proximity communications; and
   wherein each of said first and second electronic devices sends a multipart message to one another, wherein a first part of said multipart message activates an associated app on the other device.

2. The system of claim 1 wherein said database is publicly searchable.

3. The system of claim 2 wherein said database communicates electronically with said server, wherein said server comprises a meeting control server.

4. The system of claim 1 wherein said close-proximity communications comprise Bluetooth wireless communications.

5. The system of claim 1 wherein said close-proximity communications comprise WiFi wireless communications.

6. The system of claim 1 wherein said close-proximity communications comprise sound waves.

7. The system of claim 1 wherein said close-proximity communications comprise NFC.

8. The system of claim 1 wherein said database communicates electronically with said server, wherein said server comprises a meeting control server.

9. The system of claim 8 wherein said close-proximity communications comprise at least one of the following: NFC, sound waves, WiFi wireless communications and Bluetooth wireless communications.

10. A system for enabling safety in and for initial impromptu meetings facilitated by electronic devices, said system comprising:
    a database of public keys of participants including a first participant and a second participant, with each public key associated with a private key that is in the possession of the associated participant;
    a server that maintains said database and which generates and signs a ticket with a private key associated with said server, said private key being associated with a public key, and which sends a signed ticket to said first and second participants, wherein when said first and said second participants meet each other with respective first and second electronic devices for a meeting;
    wherein said public key associated with said server is downloaded to each of said first and second electronic devices if not already done and said public key associated with said first participant and said public key associated with said second participant are obtained by said second and said first electronic devices respectively if not already done and said public key associated with said server is employed by each of said first and second electronic devices to verify that said signature associated with said signed ticket is valid if not already done;
    wherein said first and second electronic devices communicate with and transfer data to and from each other via close-proximity communications; and
    wherein each of said first and second electronic devices sends a multipart message to one another, wherein a first part of said multipart message activates an associated app on the other device.

11. The system of claim 10 wherein said first and second electronic devices electronically sign said signed ticket again with said first participant's private key and said second participant's private key respectively to generate a newly signed ticket which is then sent from each of said first and second electronic devices to the other, whereupon when each of said first and second electronic devices receive said newly signed ticket from the other, said public keys associated with said first and second participants are used to verify that said signed tickets sent by said first and second participants respectively are valid to ensure that said meeting is safe.

12. The system of claim 10 wherein said database is publicly searchable.

13. The system of claim 12 wherein said database communicates electronically with said server, wherein said server comprises a meeting control server.

14. The system of claim 10 wherein said close-proximity communications comprise Bluetooth wireless communications.

15. The system of claim 10 wherein said close-proximity communications comprise WiFi wireless communications.

16. The system of claim 10 wherein said close-proximity communications comprise sound waves.

17. The system of claim 10 wherein said close-proximity communications comprise NFC.

18. The system of claim 13 wherein said close-proximity communications comprise at least one of the following: NFC, sound waves, WiFi wireless communications and Bluetooth wireless communications.

19. A method for enabling safety in and for initial impromptu meetings facilitated by electronic devices, said method comprising:
    providing a database of public keys of participants including a first participant and a second participant, with each public key associated with a private key that is in the possession of the associated participant;

instructing a server to maintain said database and to generate and sign a ticket with a private key associated with said server, said private key being associated with a public key, and to further send a signed ticket to said first and second participants, wherein when said first and said second participants meet each other with respective first and second electronic devices for a meeting;

wherein said public key associated with said server is downloaded to each of said first and second electronic devices if not already done and said public key associated with said first participant and said public key associated with said second participant are obtained by said second and said first electronic devices respectively if not already done and said public key associated with said server is employed by each of said first and second electronic devices to verify that said signature associated with said signed ticket is valid if not already done;

wherein said first and second electronic devices electronically sign said signed ticket again with said first participant's private key and said second participant's private key respectively to generate a newly signed ticket which is then sent from each of said first and second electronic devices to the other, whereupon when each of said first and second electronic devices receive said newly signed ticket from the other, said public keys associated with said first and second participants are used to verify that said signed tickets sent by said first and second participants respectively are valid to ensure that said meeting is safe;

wherein said first and second electronic devices communicate with and transfer data to and from each other via close-proximity communications; and wherein each of said first and second electronic devices sends a multipart message to one another, wherein a first part of said multipart message activates an associated app on the other device.

20. The method of claim 19 wherein said database is publicly searchable and wherein said close-proximity communications comprise at least one of the following: NFC, sound waves, WiFi wireless communications and Bluetooth wireless communications.

\* \* \* \* \*